United States Patent [19]

Schrell et al.

[11] Patent Number: 5,529,585
[45] Date of Patent: Jun. 25, 1996

[54] RAYON MODIFIED WITH POLYMERIC AMINE COMPOUNDS

[75] Inventors: Andreas Schrell, Frankfurt am Main; Bernd Huber, Kelheim, both of Germany

[73] Assignee: Hoechst AG, Germany

[21] Appl. No.: 482,032

[22] Filed: Jun. 7, 1995

[30] Foreign Application Priority Data

Jun. 30, 1994 [DE] Germany .................. 44 22 864.3

[51] Int. Cl.⁶ .................. D06P 3/60; D06P 3/66
[52] U.S. Cl. .................. 8/543; 8/538; 8/196; 8/921; 106/164; 264/78; 264/194
[58] Field of Search .................. 8/538, 561, 181, 8/921, 543; 106/163.1–169; 264/78, 194

[56] References Cited

U.S. PATENT DOCUMENTS

| | | |
|---|---|---|
| 2,191,887 | 2/1940 | Heckert . |
| 3,305,377 | 2/1967 | Mahomed . |
| 3,544,363 | 12/1970 | Rath et al. . |
| 3,793,419 | 2/1974 | Steinlin . |
| 4,194,995 | 3/1980 | Schermann et al. . |
| 4,806,126 | 2/1989 | Sternberger . |
| 4,988,365 | 1/1991 | Sternberger . |
| 5,403,361 | 4/1995 | Schrell . |

FOREIGN PATENT DOCUMENTS

| | | |
|---|---|---|
| 2084585 | 6/1993 | Canada . |
| 284010 | 9/1988 | European Pat. Off. . |
| 0248010 | 9/1988 | European Pat. Off. . |
| 0359188 | 9/1990 | European Pat. Off. . |
| 0513656 | 3/1992 | European Pat. Off. . |
| 0546476 | 7/1992 | European Pat. Off. . |
| 1469062 | 3/1969 | Germany . |
| 1948487 | 4/1970 | Germany . |
| 61-1258801 | 11/1986 | Japan . |
| 61-258801 | 11/1986 | Japan .................. C08B 16/00 |
| 448015 | 1/1970 | Switzerland . |

*Primary Examiner*—Margaret Einsmann
*Attorney, Agent, or Firm*—Connolly & Hutz

[57] ABSTRACT

Modified cellulose fiber is produced by adding a modifier to a cellulose solution and spinning fibers from the solution, or by adding a modifier to a viscose solution and spinning fibers by the viscose spinning process, said modifier being a polymeric amine compound having pendant primary, secondary or tertiary amino groups and having a molecular mass of more than 1000.

9 Claims, No Drawings

RAYON MODIFIED WITH POLYMERIC AMINE COMPOUNDS

The present invention describes cellulose fibers which have been modified with polymeric amine compounds, said modified cellulose fibers having improved dyeing characteristics and enhanced fiber strength in the dry and in the wet state.

Cellulose fibers spun from solution have essentially the same dyeing characteristics as cotton fibers. At present, the dyeing of natural or regenerated cellulose fibers requires alkali-donating agents and also electrolytes in order that satisfactory fixation results may be obtained with reactive dyes. It is precisely these needed additions, however, which are ecologically unacceptable. The future will therefore increasingly belong to cellulose-based synthetic fibers which are dyeable without salt and alkali. One possibility is to modify viscose fibers in such a way that they resemble animal fibers, such as wool or silk, in their chemical behavior and can be dyed under neutral conditions with anionic dyes without further salt or alkali additions.

Modifications of viscose have already been described in the literature. U.S. Pat. No. 3,793,419, for instance, describes a process for producing viscose fibers having modified dyeing properties. However, the process is extremely complicated and uneconomical. In addition, polyamineamides are used, which severely alter the native character of the fiber because of the predominantly lipophilic structure. This is evident for example from the use of disperse dyes in the later dyeing.

Similarly, the addition of amine compounds to improve the physical properties of viscose fibers is known. In addition to a multiplicity of monomeric or oligomeric amines, polymeric compounds such as polyethoxylated amines or polyalkylenepolyamines are also described. A review of components and their effects is given in K. Götze, Chemiefasern nach dem Viskoseverfahren, Springer Verlag 1967, 635 ff.

Similarly U.S. Pat. No. 3,305,377 describes aminalized fibers. The additions are aminoethyl- and diethylaminoethyl-celluloses in high concentration, and the dyeing is done exclusively with acid dyes.

U.S. Pat. No. 4,806,126, U.S. Pat. No. 4,988,365, and CA-A-2,084,585 describe various amino-containing compounds for use as agents for pretreating the surface of cellulose fiber textiles before dyeing. The disadvantage of such processes is an additional process step and the yellowing of the fabric.

It is an object of the present invention to provide modified viscose fibers in order that textiles composed of such fibers may be dyed with reactive dyes without salt and alkali and the aforementioned disadvantages of the prior art may be avoided.

It was found that this object is surprisingly achieved by admixture of below-defined modifiers to a viscose spinning solution or a cellulose solution.

The fibers of the invention can be dyed with reactive dyes without additions of alkali and salts. Similarly, dyeing with acid dyes is readily possible.

In addition, these fibers, if spun by the viscose process, have higher breaking strengths and breaking extensions than conventional viscose fibers, not only in the dry but also in the wet state.

The present invention accordingly provides modified cellulose fibers produced by adding a modifier to a cellulose solution and spinning fibers from the solution, or by adding a modifier to a viscose solution and spinning fibers by the viscose spinning process, where for the modifier is a polymeric amine compound having pendant primary, secondary or tertiary amino groups and having a molecular mass of more than 1000, preferably more than 20,000.

Preferred modifiers are polymeric amine compounds having molecular masses of more than 20,000, in particular more than 50,000, which comprise the monomeric units of the formulae (1), (2) and/or (3)

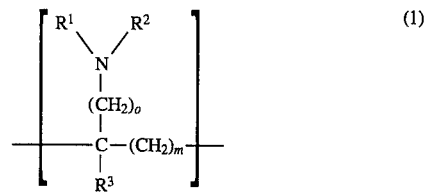

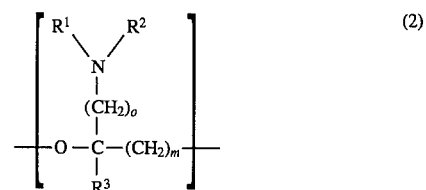

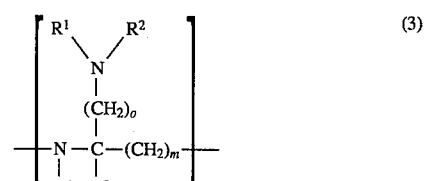

where $R^1$ and $R^2$ are identical or different and each is hydrogen, $C_1$–$C_4$-alkyl, unsubstituted phenyl or phenyl substituted by up to 3 groups of the formulae $C_1$–$C_4$-alkyl, $C_1$–$C_4$-alkoxy or halogen, preferably fluorine, chlorine and bromine;

$R^3$ is hydrogen, methyl or ethyl;

$R^4$ is hydrogen, methyl or ethyl;

m is from 1 to 4 and o is from 0 to 4.

Particularly preferred modifiers are those where $R^1$ and $R^2$ are identical or different and each is hydrogen, methyl or ethyl, m is from 1 to 2, and o is from 0 to 2, in particular polyvinylamine. Similarly, mixtures of different polymeric amine compounds can be used as modifiers for the purposes of the present invention.

The polymeric amine compounds used according to the invention can be prepared by methods perfectly familiar to the person skilled in the art, for example analogously to the polyimines described in U.S. Pat. No. 3,544,363.

In order that the modifiers remain occluded in the fibers and are not washed out in the course of the subsequent coagulation, stretching and washing processes, higher molecular weights and hence longer molecular chains are required. To obtain the improvement in the physical fiber properties it is not necessary for the modifiers to remain in the fibers, but an improvement in the dyeing properties can only be achieved if the modifiers remain in the fibers.

The minimum molecular weights for the modifiers of the invention to become occluded in the fibers to a sufficient degree is 1000, preferably more than 20,000; excellent results are obtained with molecular weights above 50,000.

The amount of modifier occluded in the cellulose fiber of the invention is advantageously from 0.1 to 10% by weight, preferably from 0.3 to 3% by weight, based on the cellulose content of the spinning dip prior to coagulation and forming. The decisive factor for the amount of modifier to be used is in particular the level of pendant amino groups.

If the fibers of the invention are produced by the viscose spinning process, first the cellulose is subjected to an alkaline digestion (alkali cellulose), then reacted with carbon disulfide, and dissolved in water or dilute alkali metal hydroxide solution, and then this viscose solution has the modifier added to it. In an alternative embodiment, the modifier is added directly to the alkalizing alkali metal hydroxide solution and the modified alkali cellulose is then reacted with carbon disulfide to form the xanthate. The addition of the modifier during the alkalizing enhances the reactivity of the cellulose for the xanthation. This permits the production of a spinning solution of better filterability and a reduction in the $CS_2$ or alkali metal hydroxide solution requirements. The reaction with carbon disulfide is advantageously carried out at temperatures from 15 to 30° C. After the dissolving, the modified cellulose fibers of the invention are obtained by subsequent spinning in an acid spin bath.

If the fibers of the invention are produced by other customary processes for producing cellulosic fibers from solution familiar to the person skilled in the art, for example the cupro process, the lyocell process and the process via low-substituted cellulose ethers, then the cellulose is dissolved in a suitable organic solvent, admixed with the modifier and spun into fibers directly from solution. The most favorable option is addition immediately prior to the spinning, in which case the mixing and homogeneous distribution can be effected by means of known mixing systems with the aid of static or dynamic mixing systems. However, the addition can also take place in any desired preliminary stage of spinning dope production.

The advantage of the modifier according to the invention is the simple technical use, since it can be incorporated into the spinning dope or the alkalizing alkali metal hydroxide solution without a solvent directly or as an aqueous preparation having a strength of more than 50%, if necessary with the aid of an emulsifier.

This makes it possible, on the one hand, to achieve high levels of occlusion and, on the other, to avoid negative consequences for physical fiber properties due to dilution effects.

The modifiers according to the invention are particularly suitable for use with viscose fibers, since not only the dyeing characteristics but also the physical properties of the fibers are improved. Following the addition, the spinning solutions can be further processed by the known processes of fiber manufacture. Serious changes to the processes are not necessary. In the case of the viscose spinning process, the process changes known from the use of modifiers, for example an increased stretch ratio, can be used with success.

There is no deterioration in the filterability of the viscose compared with addition-free samples, so that no plugging of the spinneret is observed in the course of the spinning process. If the modifier is added during the alkalization, an improvement in the filterability is observed. The forming of the viscose is carried out by customary and known methods, for example by means of spinnerets and a subsequent coagulation bath with or without further aftertreatment baths.

The pendant amino groups, compared for example to polyalkylenepolyamines with the amino group in the main chain, lead to a higher dye uptake, to better fixation of the dye molecules and to better fastness properties on the basis of an equal frequency of amine functions in the polymeric chain.

The modified cellulose fibers produced according to the invention processed into woven and knitted fabrics, can be dyed with reactive dyes by means of a very wide range of processes, such as exhaust, padding and modern printing processes, including inkjet processes, without the use of addition of electrolyte salt or alkali.

The fibers of the invention have significantly more affinity for reactive dyes than conventional viscose fibers, but otherwise hardly differ from conventional viscose fibers in the otherwise desired properties, such as hand.

The fibers of the invention spun by the viscose process or from a solution are dyeable with reactive dyes without additional alkali and salt and also with acid dyes. The cellulose fibers of the invention spun by the viscose process, in addition, are notable for improved dry and wet strengths.

The textile modified fiber material which is used for subsequent dyeing processes can be present in all processing states, for instance as yarn, staple, knitted fabric, slubbing and piece goods (woven fabric).

The fibers obtained by the methods described can be dyed as staple or after processing into sheetlike structures as, for example, woven fabrics, knitted fabrics or nonwovens by means of various processes, such as exhaust, padding or printing processes, directly without use of salt and alkali. In addition to direct and reactive dyes it is also possible to use acid dyes.

The modified textile fiber materials are dyed according to the present invention analogously to known processes for dyeing or printing fiber materials with water-soluble textile dyes and through the use of the known temperature ranges and customary dyestuff quantities, except that the dyebaths, padding liquors, print pastes or inkjet formulations require no addition of alkaline compounds, as customary for fixing fiber-reactive dyes, nor customary additions of electrolyte salts.

Suitable dyeing processes include for example the various exhaust processes, such as dyeing on the jigger or on the reel beck or dyeing from long or short liquor, dyeing in jet dyeing machines, dyeing by short-time pad-batch processes or by a pad-superheated steam fixation process. Suitable printing processes include conventional printing techniques, including inkjet printing and transfer printing.

The dyes which are used for dyeing the modified cellulose are generally anionic in nature. Of particular suitability are the fiber-reactive textile dyes which are capable of reacting with hydroxyl groups, for example of cellulose, or amino and thiol groups, for example of wool and silk, of synthetic polymers, such as polyamides, or else the celluloses aminated according to the present invention, to form a covalent bond. Suitable fiber-reactive components on the textile dyes include in particular sulfatoethylsulfonyl, vinylsulfonyl, chlorotriazinyl and fluorotriazinyl and also combinations thereof.

Suitable reactive dyes for dyeing or printing cellulose fibers modified according to the present invention include all water-soluble, preferably anionic, dyes which preferably have one or more sulfo and/or carboxyl groups and which contain fiber-reactive groups. They can belong to the class of the azoic dyes, the class of the direct dyes, the class of the vat dyes and the class of the acid dyes, the copper complex, cobalt complex and chromium complex dyes, copper and nickel phthalocyanine dyes, anthraquinone, copper formazan, azomethine, nitroaryl, dioxazine, triphendioxazine, phenazine and stilbene dyes. These dyes have been numerously described in the literature, for example in U.S. Pat. No. 5 403 361, and are perfectly familiar to the person skilled in the art.

Unless otherwise stated, parts in the examples which follow are by weight.

EXAMPLE 1

2800 parts of a customary spinning viscose having a cellulose content of 9%, an alkali content of 5.5% and a viscosity of 40 falling-ball seconds at 30° C. are admixed with 15.1 g of an aqueous polyvinylamine preparation containing about 12% by weight of polyvinylamine having a Fikentscher K value of 120.

The amount used based on cellulose is 0.7%. Following devolatilization, the spinning dope is spun by a customary viscose spinning process into an aqueous bath which contains sulfuric acid, sodium sulfate and zinc sulfate. The tow obtained is stretched in acid baths, cut, washed, spin finished and dried.

EXAMPLE 2

Example 1 is repeated except that the stretch in the acid baths is increased by 10%.

COMPARATIVE EXAMPLE

For comparison, a spinning dope is spun into fibers under the conditions of Example 1 without the addition of a modifier.

Fiber Properties:

| Property | Unit | Ex. 1 | Ex. 2 | Comp. ex. |
| --- | --- | --- | --- | --- |
| Linear density | dtex | 1.44 | 1.33 | 1.45 |
| Strength | cN/tex | 27.3 | 30.1 | 24.5 |
| Elongation | % | 19.5 | 19.0 | 19.2 |
| Wet strength | cN/tex | 14.1 | 15.2 | 12.1 |

Dyeing Properties:

The fiber tufts were dyed under the following conditions:

Dyeing 1 (reactive dyes):

The fibers of the comparative example were dyed conventionally with 2% of a yellow dye of the formula

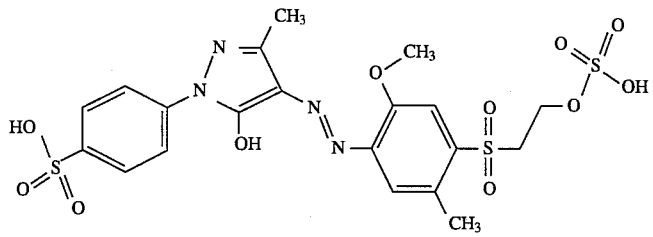

and 3% of a turquoise dye of the formula

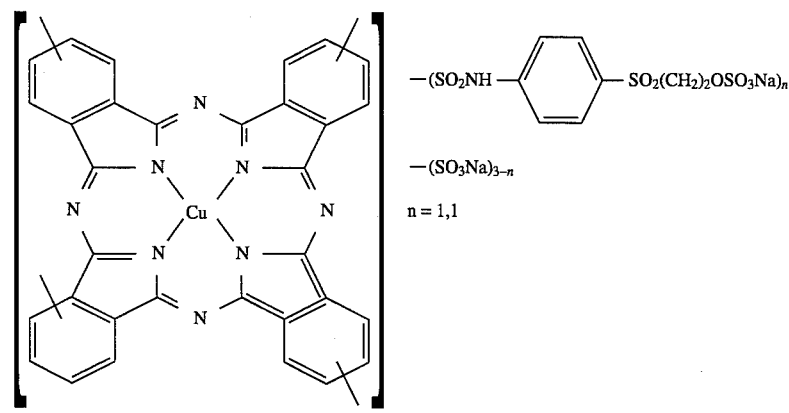

known from DE-A-11 79 317 in the presence of 1 g/l of 40% strength sodium hydroxide solution, 5 g/l of sodium carbonate and 50 g/l of sodium sulfate at a liquor ratio of 25:1 at 60° C. for 60 minutes. After dyeing, the fibers were green to a medium depth of shade.

Dyeing 2 (Reactive Dyes):

The same method was used to dye the fibers without addition of alkali and salt.

After dyeing, the fibers of Examples 1 and 2 were green to a deeper depth of shade than in the case of dyeing 1. The fibers of the comparative example had not taken up any dye.

Dyeing 3 (Acid Dyes):

The dyes were dyed at a liquor ratio of 25:1 with 1% of the yellow dye C.I. Acid Yellow 17 (C.I. No. 18 965) of formula

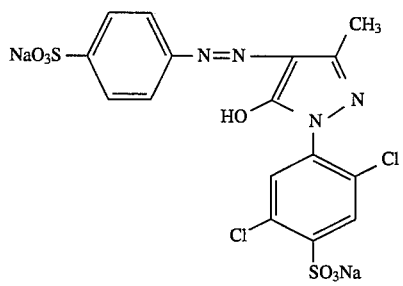

and 2% of the blue dye C.I. Acid Blue 40 (C.I. No. 62 125) of formula

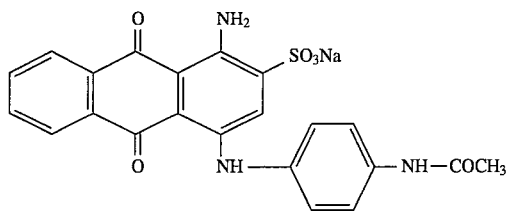

in the presence of 2% of 60% strength acetic acid at 98° C. for 60 minutes. The fibers of Examples 1 and 2 turned blue, while the fibers of the comparative example remained undyed.

What is claimed is:

1. A process for dyeing and printing fiber materials with water-soluble textile dyes which comprises carrying out the dyeing with a dye solution without the addition of electrolyte salts and alkali and using a modified cellulose fiber produced by adding a modifier to a cellulose solution and spinning fibers from the solution, or by adding a modifier to a viscose solution and spinning fibers by the viscose spinning process, wherefor the modifier is a polyvinylamine compound having a molecular mass of more than 1000.

2. The process of claim 1 wherefor the polyvinylamine compound has a molecular mass of more than 20,000.

3. The process of claim 1 wherefor the polyvinylamine compound has a molecular mass of more than 50,000.

4. The process of claim 1, wherein the fibers are spun by a viscose spinning process.

5. The process of claim 1, wherein the fibers are spun by the cupro process or by the Lyocell process.

6. The process of claim 1 wherein the dye contains a fiber-reactive group.

7. Yarn, woven fabric dyed or knitted fabric in modified cellulose fiber dyed as claimed in claim 1.

8. The process of dyeing as claimed in claim 1, wherein in said modified fiber material an amount of from 0.1 to 10% by weight, based on the cellulose content of the spinning dope used, of said modifier is occluded.

9. The process of dyeing as claimed in claim 1, wherein in said modified fiber material an amount of from 0.3 to 3% by weight, based on the cellulose content of the spinning dope used, of said modifier is occluded.

* * * * *